US006537442B1

(12) United States Patent
Nieman et al.

(10) Patent No.: US 6,537,442 B1
(45) Date of Patent: Mar. 25, 2003

(54) COGEL CONTAINING OXIDIC COMPOUNDS OF TETRAVALENT, TRIVALENT, AND DIVALENT METALLIC ELEMENTS

(75) Inventors: Jan Nieman, Maarsen (NL); Stephan Janbroers, Almere (NL)

(73) Assignee: Akzo Nobel N.V. (NL)

( * ) Notice: Subject to any disclaimer, the term of this patent is extended or adjusted under 35 U.S.C. 154(b) by 0 days.

(21) Appl. No.: 09/720,852

(22) PCT Filed: Jun. 24, 1999

(86) PCT No.: PCT/EP99/05818

§ 371 (c)(1),
(2), (4) Date: Feb. 20, 2001

(87) PCT Pub. No.: WO00/00286

PCT Pub. Date: Jan. 6, 2000

(30) Foreign Application Priority Data

Jun. 29, 1998 (EP) .............................................. 98202185
Jul. 31, 1998 (EP) .............................................. 98202600

(51) Int. Cl.⁷ ........................ C10G 47/02; C10G 45/04; C10G 45/46; B01J 21/00
(52) U.S. Cl. ............................... 208/111.01; 208/111.1; 208/111.25; 208/111.3; 208/111.35; 208/216 R; 208/216 PP; 208/217; 208/251 H; 208/254 H; 208/143; 208/144; 208/135; 208/136; 208/137; 502/234; 502/235; 502/236
(58) Field of Search .......................... 208/111.01, 111.1, 208/111.25, 111.3, 111.35, 216 R, 216 PP, 217, 251 H, 254 H, 143, 144, 135, 136, 137; 502/234, 235, 236

(56) References Cited

U.S. PATENT DOCUMENTS

| | | | | |
|---|---|---|---|---|
| 2,348,647 A | * | 5/1944 | Reeves et al. ............... | 208/114 |
| 2,935,483 A | | 5/1960 | Schwartz ..................... | 252/455 |
| 3,193,491 A | * | 7/1965 | Cramer et al. .............. | 208/110 |
| 3,242,100 A | * | 3/1966 | Harnsberger et al. ... | 208/111.35 |
| 3,248,318 A | * | 4/1966 | White ...................... | 208/111.3 |
| 3,280,040 A | * | 10/1966 | Jaffe ....................... | 208/111.1 |
| 3,346,509 A | * | 10/1967 | Stewart ........................ | 502/11 |
| 3,523,912 A | * | 8/1970 | Jaffe ........................... | 502/219 |
| 3,557,242 A | * | 1/1971 | Sampson et al. ............ | 502/252 |
| 3,637,527 A | * | 1/1972 | Jaffe ............................ | 502/223 |
| 3,844,978 A | | 10/1974 | Hickson ...................... | 252/455 |
| 4,499,194 A | | 2/1985 | Hrada et al. ................... | 502/8 |
| 4,749,676 A | | 6/1988 | Blumenthal et al. ........ | 502/251 |
| 5,049,536 A | * | 9/1991 | Bellussi et al. ............. | 502/235 |

FOREIGN PATENT DOCUMENTS

| | | | |
|---|---|---|---|
| DE | 0152331 | 11/1981 | ......... C07C/11/107 |
| EP | 0097047 | 12/1983 | ............ B01J/37/02 |
| EP | 0224182 | 6/1987 | ........... C01B/33/30 |
| EP | 0325827 | 8/1989 | ............ B01J/27/19 |
| GB | 939214 | 10/1963 | |
| GB | 976789 | * 12/1964 | |
| NL | 7501204 | 8/1976 | ............ B01J/21/12 |
| WO | WO96/07477 | 3/1996 | ............ B01J/21/16 |
| WO | WO96/07613 | 3/1996 | ........... C01B/33/40 |

OTHER PUBLICATIONS

J.T. Kloprogge, et al, *Clays and Clay Minerals*, vol. 41, No. 1, 1993, "Development of Ammonium–Saponites from Gels with Variable Ammonium Concentration and Water Content at Low Temperatures", pp. 103–110.
Abstract of JP50 023390 A (Toa Fuel Ind KK), Aug. 7, 1975.
Copy of International Search Report dated Nov. 2, 1999.

* cited by examiner

*Primary Examiner*—Walter D. Griffin
(74) *Attorney, Agent, or Firm*—Louis A. Morris

(57) ABSTRACT

The invention pertains to a cogel comprising oxidic compounds of one or more trivalent metallic elements selected from the group of aluminum, borium, gallium, chromium, iron, cobalt, manganese, vanadium, molybdenum, tungsten, indium, rhodium, scandium, or mixtures thereof, oxidic compounds of one or more tetravalent metallic elements selected from the group of silicon, titanium, germanium, or mixtures thereof and oxidic compounds of one or more divalent metallic elements with at least one divalent metallic element not selected from Group VIII non-noble metallic elements, wherein a) the cogel is essentially X-ray amorphous apart from saponite, if present;
b) the saponite content $C_A$ of the cogel is less than 60%;
c) the cogel has a surface area of at least 400 m²/g;
d) the cogel has a cation-exchange capacity of at least 0.5 wt %; and
e) the total of sodium and potassium contained in the cogel amounts to less than 0.5 wt %, based on the total weight of the cogel. The invention further relates to a process for preparing said cogel as well as to catalysts comprising these cogels as cracking component, a process for preparing said catalysts, and the use of these catalysts for hydroprocessing applications.

21 Claims, No Drawings

COGEL CONTAINING OXIDIC COMPOUNDS OF TETRAVALENT, TRIVALENT, AND DIVALENT METALLIC ELEMENTS

CROSS REFERENCE TO RELATED APPLICATIONS

This application is based on PCT International Filing Number PCT/EP99/05818, having International Filing date Jun. 24, 1999 which claims priority from European Application Serial No.: EP98202185.9, filed Jun. 29, 1998 and European Application Serial No. 98202600.7, filed Jul. 31, 1998, all of which are incorporated by reference herein in their entirety.

BACKGROUND OF THE INVENTION

1. Field of the Invention

The invention relates to cogels of various metallic elements, alumina process for preparing said cogels, catalysts comprising these cogels, a process for preparing such catalysts, and the use of such catalysts for hydroprocessing applications.

2. Prior Art

In the past, synthetic clays have been synthesized by hydrothermal crystallization of a mixture of clay material precursors. This hydrothermal treatment is carried out in an autoclave at high pressures and temperatures with reaction times in the order of several hours to several days. Such a treatment is described, e.g., in U.S. Pat. No. 3,844,978, EP-A-0224 182, and in J. T. Kloprogge et al., *Clays and Clay Minerals*, Vol. 41, No. 1, 1993, pages 103–110. The last reference describes materials comprising 36–100% saponite with the balance being an amorphous cogel of oxidic compounds of silicon, aluminum, and magnesium. These materials are characterized by relatively low surface areas in the range of 166–375 $m^2/g$ (after calcination at 550° C.). Especially the materials with low saponite contents are characterized by very low surface areas below 300 $m^2/g$ (after calcination at 550° C.).

The synthesis of clay minerals via hydrothermal crystallization is technically relatively difficult and time-consuming. Therefore, in recent years a great deal of research has been done to develop synthetic clay materials, which are obtainable without using hydrothermal crystallization techniques. WO 96/07613 describes the preparation of such synthetic clay minerals by bringing the pH of an aqueous liquid containing precursors for the clay to be prepared to a value of 3–9 and the temperature of the liquid to a value of from 60° to 350° C. Both the temperature and the pH are maintained at said range for the time required for the formation of the clay mineral. The time required depends on the temperature applied: at lower temperatures of 60°–125° C., times of 5 to 25 hours are necessary, whereas at temperatures in the range of 150° C. and higher, times in the order of some minutes to approximately 2.5 hours may suffice. However, as can be deduced from the Examples of said reference, to obtain the desired clay minerals, usually times in the order of 7 to 48 hours must be applied. The resulting clays have a crystalline structure with distinct peaks in the X-ray diffraction pattern at about $2\Theta \approx 20°$, $2\Theta \approx 35°$ and $2\Theta \approx 60°$. They are made up of elementary three-layer platelets with dimensions from 0.01 μm to 1 μm, which are optionally stacked to up to 20 platelets. One particular example of such a clay material is a saponite, which is a clay in which the tetravalent silicon ions of the tetrahedron layers are at least partly replaced by trivalent aluminum ions and in which the octahedral layer contains divalent ions almost exclusively. The deficiency of positive charge which results from the replacement of the silicon ions by aluminum ions is compensated by including cations ("counter-ions") between the platelets.

The use of these synthetic clay minerals as cracking component in catalytic applications is described in WO 96/07477. There, catalysts are disclosed which at least comprise a hydrogenation metal component and a swelling synthetic clay. The catalyst is suitable for hydroprocessing of hydrocarbon feeds.

A disadvantage of the clay minerals of WO 96/07613 is their poor filterability, which typically is above 2000 s, expressed as normalized filtration time. Because of this low filterability, the generally required washing step of the resulting precipitated clay mineral is difficult to apply on a technical scale. It is therefore an object of the present invention to provide clay-like materials with good filterability which are suitable as, e.g., cracking components in hydroprocessing catalysts.

If clay minerals are used as cracking component in catalysts, it is essential that they comprise Brønsted acid groups, since these are at least partially responsible for the cracking ability of these compounds. Brønsted acid sites can be achieved by replacing the non-hydrolyzable counter-ions (such as sodium or potassium cations) by ammonium ions which compensate the deficiency of positive charge of the clays and then heating the whole. This process will result in ammonia desorption, leaving a proton to form a Brønsted site. Brønsted sites can also be introduced by replacing the counter-ions with hydrolyzable metal ions. Hydrolysis will then give hydrogen ions.

It must be noted that this introduction of acidic Brønsted sites is only possible if the material possesses an overall negative charge and, consequently, exchangeable counter-ions which can be replaced by ammonium ions or hydrolyzable metal ions. In other words, a material can only be used as cracking component if it is characterized by a cation-exchange capacity (CEC), i.e. if it possesses cations which can be exchanged, e.g., with ammonium ions. To obtain a final catalyst with sufficient cation-exchange capacity, it is therefore necessary that the cracking component which is incorporated into the catalyst has a sufficiently high cation-exchange capacity.

Further, as catalysts to be used in hydroprocessing are generally calcined prior to use and are subject to relatively high temperatures during use and regeneration, it is preferred that the cation-exchange capacity of the cracking components is not dramatically reduced when being subjected to high temperature.

As mentioned above, the clay minerals prepared in WO 96/07477 such as saponites contain exchangeable counter-ions. However, due to the poor filterability of the clay minerals, such an exchange takes a long time and is therefore difficult to perform on a commercial scale. A further object of the present invention therefore consists of the provision of easily filterable clay-like materials with high cation-exchange capacities in which a substantial amount of the counter-ions compensating the deficiency of positive charge: of the clay-like materials has been replaced by hydrogen ions or counter-ions which can generate hydrogen ions.

One further important characteristic of a cracking component is its surface area. For good catalytic performance, a high surface area is essential. To obtain a final catalyst with sufficient catalytic performance, it is therefore necessary that the cracking component which is incorporated into the catalyst has a sufficiently high surface area. Further, for the same reasons as given with respect to the cation-exchange capacity, it is preferred that the surface area of the cracking components is not dramatically reduced when being subjected to high temperature.

References dealing with various cogels include EP0097047, NL 7501204, U.S. Pat. No. 2,935,483 and DD 0152331.

SUMMARY OF THE INVENTION

Cogel of the Present Invention

Surprisingly, it has now been found that all the above-mentioned characteristics can be achieved with a cogel comprising oxidic compounds of one or more trivalent metallic elements selected from the group of aluminum, borium, gallium, chromium, iron, cobalt, manganese, vanadium, molybdenum, tungsten, indium, rhodium, scandium, or mixtures thereof, oxidic compounds of one or more tetravalent metallic elements selected from the group of silicon, titanium, germanium, or mixtures thereof, and oxidic compounds of one or more divalent metallic elements with at least one divalent element not selected from Group VIII non-noble metallic elements, wherein a) the cogel is essentially X-ray amorphous apart from saponite, if present;

b) the saponite content $C_A$ of the cogel is less than 60 wt. %;

c) the cogel has a surface area of at least 400 m$^2$/g;

d) the cogel has a cation-exchange capacity of at least 0.5 wt %; and e) the total of sodium and potassium contained in the cogel amounts to less than 0.5 wt %, calculated as metal, based on the total weight of the cogel.

Other embodiments of the present invention encompass further details relating to further ingredients in the cogel, and details concerning the process for preparation of the cogel, a catalyst containing the cogel and process for making the catalyst and processes in which the catalyst is used, all of which are hereinafter disclosed in the following discussion of each of those facets of the invention.

DETAILED DESCRIPTION OF THE INVENTION

As set out above, apart from optionally present saponite, the cogel of the present invention is essentially X-ray amorphous. The term "X-ray amorphous" is well-known to the person skilled in the art and means that no crystalline peaks are contained in a spectrum but only broad amorphous peaks are observed. The term "essentially X-ray amorphous" in the sense of the present invention means that apart from any saponite peaks, there are essentially no further crystalline peaks visible in the X-ray diffraction pattern of the cogel. Of course, small crystalline peaks, e.g., due to impurities present in the cogel, such as brucite, are not excluded by the term "essentially X-ray amorphous". However, the term "essentially X-ray amorphous" in any case excludes cogels, which apart from saponite, contain a major part of one or more further crystalline components. Saponite peaks generally include crystalline peaks located at 20°(2θ), 35°(2θ), and 60°(2θ), and optionally 28°(2θ).

The saponite content $C_A$ is determined from the X-ray diffraction pattern of the cogel. Details will be described below.

To have sufficient catalytic activity, it is essential that the cogel has a surface area of at least 400 m$^2$/g. Preferably, the surface area of the cogel is at least 450 m$^2$/g and even more preferably, it is at least 500 m$^2$/g.

As has been set out above, a hydroprocessing catalyst is generally calcined prior to its use. It is therefore preferred that the surface area of the cogel to be used as cracking component in that catalyst does not decrease dramatically during calcination. More in particular, it is preferred that the quotient between the surface area of the cogel after calcination in air at 550° C. for one hour and the surface area of the uncalcined cogel is at least 0.80. This quotient will be designated as "surface area ratio" in the following. It is further preferred that the surface area of the cogel after calcination in air at 550° C. for one hour is at least 350 m$^2$/g and more preferably at least 400 m$^2$/g.

It is noted that a coprecipitate of silica, alumina, and oxides of divalent metallic elements such as Fe, Co, Ni, Zn, Be, Mg, and Cu on porous particles is disclosed in EP 0097047. However, none of the coprecipitates disclosed in this reference has a surface area before or after calcination higher than 300 m$^2$/g.

Another reference dealing with cogels, e.g., comprising silica, alumina and magnesia is NL 7501204. However, the surface areas of the cogels disclosed in this reference are all significantly below 400 m2/g. Further, U.S. Pat. No. 3,951,864 deals with such silica-alumina-magnesia cogels. However, after having reworked relevant examples of this reference, the applicant found that the cogels disclosed therein are clearly different from the cogel of the present invention, at least in that the surface area of the uncalcined cogels obtained in these examples is significantly below 400 m$^2$/g.

Another reference also dealing with cogels of silica, alumina and magnesia is U.S. Pat. No. 2,935,483. Relevant examples of this reference have been reworked by the applicant and it was found that also the cogels disclosed in this reference are clearly different from the cogel of the present invention, at least in that the cogels contain significantly more than 0.5 wt % of the total of sodium and potassium, based on the total weight of the cogel. As has been set out above, such a cogel is not very suitable for hydroprocessing applications.

Furthermore, DD 0152331 is dealing with similar cogels. This reference refers to a catalyst used in the dimerization of propene comprising a supported nickel aluminosilicate. The catalyst is prepared by the precipitation of aluminum and/or nickel hydroxide on silica gel or X-ray amorphous aluminosilicates, followed by a thermal treatment. This catalyst thus comprises nickel, a Group VIII non-noble metallic element, as only divalent metallic element. If such a catalyst is used in hydroprocessing applications wherein the catalyst is sulphided either prior to or during use, the nickel will be sulphided and removed from the cogel.

As nickel is the only divalent metallic element present in the cogel, this means that sulphidation would remove all divalent metallic elements present in the cogel, leading to the complete decomposition thereof. Consequently, the cogel of DD 0152331, or generally any cogel, which comprises a Group VIII non-noble metal as only divalent metallic element is unsuitable as cracking component in hydroprocessing applications. It is therefore essential to the cogel of the present invention that it comprises a divalent metallic element which is not exclusively selected from Group VIII non-noble metallic elements.

The trivalent metallic element contained in the cogel of the present invention is selected from the group of aluminum, borium, gallium, chromium, iron, cobalt, manganese, vanadium, molybdenum, tungsten, indium, rhodium, scandium, or mixtures thereof. The trivalent metallic element preferably comprises aluminum, gallium, borium, or mixtures thereof, more preferably comprises aluminum and most preferably consists essentially of aluminum. The tetravalent metallic element contained in the cogel is selected from the group of silicon, titanium, germanium, or mixtures thereof. It preferably comprises silicon, titanium, or mixtures thereof, more preferably comprises silicon, and most preferably consists essentially of silicon. The one or more divalent metallic elements of the cogel of the present invention are generally selected from non-Group VIII metallic elements such as, preferably, magnesium, zinc, manganese, copper, beryllium, or mixtures thereof.

Optionally, these non-Group VIII metallic elements can be combined with one or more Group VIII non-noble metallic elements. Preferred Group VIII non-noble metallic elements are cobalt or nickel or mixtures thereof. However, as indicated above, the one or more divalent metallic elements must not be selected exclusively from Group VIII non-noble metallic elements. The non-Group VIII metallic element preferably comprises magnesium and more preferably consists essentially of magnesium.

The molar ratio between the oxidic compounds of the tetravalent and the oxidic compounds of the trivalent metallic elements of the cogel of the present invention generally is at least 2 and not more than 30. Preferred are molar ratios of at least 4, even more preferably of at least 6. It is further preferred that the molar ratio is not more than 20, more preferably not more than 12. Generally, the atomic ratio between the one or more divalent metallic elements and the total of tri- and tetravalent metallic elements contained in the cogel of the present invention lies between 0.03 and 1.00. It is preferred that this atomic ratio lies between 0.10 and 1.00 and more preferably between 0.20 and 0.50.

Generally, at least 50%, preferably at least 70%, of the one or more trivalent metallic elements in the cogel of the present invention such as aluminum has a coordination number of 4. This results in a negative charge of the cogel, which is counterbalanced by counter-ions. Depending on the starting materials, sodium or potassium ions may be present as counter-ions. In order to make the cogel suitable for hydrocracking applications, these sodium and potassium ions have to be replaced by, e.g., ion-exchange with ammonium or hydrolyzable metal ions. As has been set out above, upon ammonia desorption or upon hydrolysis of the hydrolyzable metals, hydrogen ions are generated. The amount of hydrogen ions of the cogel can be indirectly characterized by determining the amount of sodium ions and potassium ions present in the cogel. To show sufficient catalytic activity the cogel must contain less than 0.5 wt % of the total of sodium and potassium, based on the total weight of the dry cogel. Preferred is that the total of sodium and potassium, based on the total weight of the dry cogel, amounts to less than 0.3 wt %, more preferably to less than 0.2 wt %, and most preferably to less than 0.1 wt %.

As has been mentioned above, high cation-exchange capacities are desirable in cracking applications. The cation-exchange capacity of the cogel of the present invention is at least 0.5 wt %, and preferably is above 1.0 wt %, more preferably above 2.0 wt %. Generally, the cation-exchange capacity of the cogel is less than 10 wt %. Further, as has been set out above, the cation-exchange capacity of the cogel should not dramatically decrease when high temperatures are applied, e.g., during calcination or use. Therefore, it is preferred that the quotient between the cation-exchange capacity of the cogel after calcination in air at 550° C. for one hour and the cation-exchange capacity of the uncalcined cogel is at least 0.6 and more preferably at least 0.7. This quotient will be designated as "cation-exchange capacity ratio" or "CEC ratio" in the following. Furthermore, it is preferred that the cation-exchange capacity of a sample calcined in air for one hour at 550° C. is at least 0.5 wt %, more preferably 1.0 wt % and most preferably at least 2.0 wt %.

Further, as has been set out above, the saponite content $C_A$ of the cogel is less than 60%. Preferably, the saponite content $C_A$ is less than 55% and more preferably less than 50%. It is further preferred that the saponite content $C_A$ is at least 10% and more preferably at least 20%. The saponite content $C_A$ of the cogel is determined by method A, which will be explained below. In addition, it is preferred that the saponite content of the cogel according to the invention $C_B$ is less than 30%, more preferably less than 25%, still more preferably less than 20%. The saponite content $C_B$ is determined by method B, which will also be explained below.

The properties of the cogel of the present invention can be determined by the following characterization methods:

a) Determination of the Amount of Saponite in the Cogel

Method A

The X-ray diffraction pattern of a mildly ground material previously dried at 120° C. is measured in a standard sample holder using a conventional powder diffractometer, such as a Siemens D5000 θ—θ reflection diffractometer with nickel filtered Cu-Kα radiation (measuring conditions: generator settings are 40 kV and 50 mA; divergence and anti-scatter slits 0.5°; 0.2 mm detector slit) The scan range, expressed as 2θ, is 12°–70° with a step size of 0.05°, and a time per step of 20 seconds.

Amorphous material present in the sample produces a broad peak with a peak maximum at about 26°(2θ), whereas peaks due to the presence of saponite are located at about 20°(2θ), 35°(2θ) and 60°(2θ). The peaks at about 20°(2θ) and 35°(2θ) show overlap with the broad peak at about 26°(2θ). Using a (split) Pearson VII profile function and a linear background, the four peaks are fitted in order to determine their peak areas and to separate the overlapping peaks. The amount of saponite $C_A$ contained in the cogel of the present invention is defined as 100S /(S+T) % where S is the total peak area of the saponite peaks at about 20°(2θ), 35°(2θ) and 60°(2θ) and T is the area of the broad peak at about 26°(2θ). The above will enable the skilled person to determine the saponite content $C_A$ of the cogel of the invention. Below, a suitable procedure will be discussed in more detail for convenience sake.

Details of the Fit Procedure:

Fitting is performed by applying the program PROFILE (v1.30) from SOCABIM (represented by Bruker/AXS). The whole fit procedure is carried out in two separate steps. In the first part of the fit procedure the fit range is restricted to the 13.0°(2θ)–49.0°(2θ) range and the three peaks located in this range, viz. the peaks at about 20°(2θ), 26°(2θ) and 35°(2θ) are fitted. In the second part of the fit procedure, the fit range is restricted to the 54.0°(2θ)–66.0°(2θ) range and the peak located in this fit range, viz. the peak at about 60°(2θ) is fitted.

The first part of the fit procedure is carried out as follows:
1) the prefit status is defined:
   a) three different models A, B, and C are defined for the fit functions applied for the three peaks at about 20°(2θ) (model A), 26°(2θ) (model B), and 35°(2θ) (model C), viz.

model A: Pearson VII profile function with FWHM (Full Width Half Maximum) fixed at 3.2°(2θ) and adjustable exponent set at, e.g., 1.1, model B: Pearson VII profiles function with FWHM fixed at 9.0°(2θ) and adjustable exponent set at, e.g., 5.8, model C: split Pearson VII profile function with adjustable left and right half FWHM parameters set at, e.g., 2.8°(2θ) and, e.g., 4.0°(2θ) respectively, and with adjustable left and right exponents set both at, e.g., 0.6.

b) the $\alpha_2/\alpha_1$ ratio is set at 0.0.

c) three peaks are initialized at the positions 20.1°(2θ), 25.5°(2θ), and 34.7°(2θ), respectively.

d) the left-hand side of the linear background, which is located at the position 13°(2θ), is fixed at the intensity I(13°)–0.10I(49°), and the right-hand side, located at the position 49°(2θ), is fixed at the intensity I(49°)–0.10I(499), where I(t°) is the intensity at position t°(2θ) obtained by, e.g., averaging the observed intensity in the 2θ range bounded by (t–1)° and t°(2θ).

2) refinement is carried out in 10 cycles wherein the fixed parameters are kept fixed at the above-described values and the adjustable parameters are adjusted during the refinement procedure.

The peak areas obtained with the above-described fit procedure for the fit functions of models A, B, and C are taken as the peak areas of the peaks at about 20°(2θ) (model A), 26°(2θ) (model B), and 35°(2θ) (model C). If either one or both of the peaks at about 20°(2θ) and 35°(2θ) is not found by the program, or if the left half FWHM of the fit function of model C applied for the peak at about 35°(2θ) is larger than 5°(2θ) after refinement, steps (1) and (2) are carried out again with model B alone and the thus obtained peak area of the fit function of model B is taken as the peak area of the broad peak at about 26°(2θ). The peak areas of the peaks at about 20°(2θ) and 35°(2θ) are taken to be 0.0 in this case.

The second fit procedure is carried out as follows:

1) the prefit status is defined as follows:

a) a model D is defined for the fit function applied for the peak at about 60°(2θ) as Pearson VII profile function with adjustable FWHM set at, e.g., 2.8°(2θ) and adjustable exponent set at, e.g., 2.4, b) the $(\alpha_2/\alpha_1)$ ratio is set at 0.0.

c) a peak is initialized at the position 60.2°(2θ).

d) a linear background is defined by the program and adjusted during refinement.

2) refinement is carried out in 5 cycles as described for the first part of the fit procedure.

The peak area obtained with the fit function of model D is taken as the peak area of the peak at about 60°(2θ).

For good order's sake, it is noted that it will be evident to the skilled person to select the adjustable parameters in the prefit status in such a way that the initial peak and the actual peak match as closely as possible. It is further evident to the skilled person that if the program does not find the corresponding peak when the adjustable starting parameters have been chosen properly, the area of this peak is to be taken to be zero.

Method B

The material is analyzed with X-ray diffraction as described for method A with the single exception that the time per step is 40 s instead of 20 s. The amount of saponite $C_B$ is determined according to $$C_B = \frac{100R}{2.5 + R}$$

where R is the ratio between the background subtracted peak area of the peak at about 60°(2θ) and the background subtracted peak height of the broad peak at about 26°(2θ). The background subtracted peak area of the peak at about 60°(2θ) is, e.g., obtained by applying the "compute single peak" option available in the EVA software (v3.30) of SOCABIM (represented by Bruker/AXS). Via this option in automatic background mode, a linear background is drawn from 55.0 to 65.0°(2θ). The background corrected peak area is obtained as the normalized net area provided by the program. The background subtracted peak height of the broad peak at about 26°(2θ) is obtained by subtracting the intensity measured at 49°(2θ), which is taken to be the background, from the intensity at the peak maximum of the broad peak at about 26°(2θ).

b) Determination of the Surface Area (SA)

The surface area of a sample previously evacuated at 300° C. is determined via the B.E.T. method (nitrogen adsorption, $p/p_o$ range: 0.06–0.30).

When, in the present specification, no further specification is given with respect to a certain surface area, this means that the surface area refers to the surface area of an uncalcined sample. Otherwise, i.e., when the sample has been calcined prior to the determination of the surface area, it is always specified to be the surface area of a calcined sample.

c) Determination of the Cation-Exchange Capacity (CEC)

The cogel is exchanged three times with a 0.2 molar NaCl solution during one hour at a temperature of 20° C. For each gram (dry base) of the cogel, 100 cm³ of NaCl solution is used. The pH of the solutions is not adjusted during the exchange. Subsequently, the exchanged cogel is washed with water until no chloride can be detected in the wash water using a silver-nitrate solution. The amount of sodium incorporated into the cogel after these exchange and wash steps is determined. The cation-exchange capacity is expressed as gram sodium per 100 g of the exchanged cogel (dry base).

When, in the present specification, no further specification is given with respect to a certain cation-exchange capacity, this means that the cation-exchange capacity refers to the cation-exchange capacity of an uncalcined sample. Otherwise, i.e., when the sample has been calcined prior to the determination of the surface area, it is always specified to be the surface area of a calcined sample.

d) Determination of the Amount of Trivalent Metallic Elements with a Coordination Number of 4

The amount of trivalent metallic elements with a coordination number of 4 is measured on the dried cogel. It is determined, e.g., by NMR. If, e.g., aluminum is the trivalent metallic element, the amount of aluminum with a coordination number of 4 is determined by $^{27}$Al-NMR.

e) Determination of the Normalized Filtration Time NFT

An amount of the cogel containing slurry is filtered at a temperature of 60° C. at 20 cm Hg underpressure using a filter of approximately 100 cm² with a black ribbon-25 589 filter (commercially available at Schleicher and Schnel) to obtain a filter cake with a thickness of between 10 and 15 mm. An amount of 1.5 displacements of demineralized water with a temperature of 60° C. is gently poured onto the filter cake and filtered until the surface is just dry. This washing step is repeated twice. Then the filter cake thickness $d_1$ in mm is measured. An amount of 1.5 displacements of demineralized water with a temperature of 60° C. is filtered until the surface is just dry. The required time t in seconds for the water to be filtered through the filter cake in this last filtration step is determined.

The normalized filtration time NFT is calculated according to the following equation $$NFT = \frac{t}{1.5D^2}$$

with D being the normalized thickness of the filter cake calculated as $$D = \frac{d_1 \text{ (mm)}}{10 \text{ (mm)}}$$

Thus, in seconds the NFT corresponds to the filtration time in which 1 (volume) displacement passes through a filter cake with a normalized thickness of 10 mm.

For good order's sake, it is noted that the cogel of which the NFT is to be determined must not have been dried or stored for a longer time but must be a freshly prepared cogel.

f) Determination of the Molar Ratio Between the Oxidic Compounds of the Tetravalent and of the Trivalent Metallic Elements of the Cogel and of the Atomic Ratio Between the Divalent and the Total of tri- and Tetravalent Metallic Elements in the Cogel The values given for this ratio refer to the molar or atomic ratio in the final cogel and can be determined from the final product by methods known in the art.

Preparation of the Cogel of the Present Invention

The cogel of the present invention is prepared by a process comprising the steps of mixing an aqueous solution of a source of oxidic compounds of one or more suitable trivalent metallic elements and an aqueous solution of a source of oxidic compounds of one or more suitable tetravalent metallic elements and an aqueous solution of a source of oxidic compounds of one or more suitable divalent metallic elements; choosing the pH conditions in such a way as to cause the precipitation of the oxidic compounds of di-, tri-, and tetravalent metallic elements present in the mixture; isolating the precipitate containing the oxidic compounds of di-, tri-, and tetravalent metallic elements, if applicable before the saponite content $C_A$ of the precipitate has become equal to or higher than 60 wt. %, and, if necessary, carrying out an ion-exchange treatment to reduce the total of sodium and potassium present in the final cogel to an amount of less than 0.5 wt %, based on the total weight of the cogel.

The ion-exchange treatment preferably is performed in such a way as to reduce the total of sodium and potassium present in the cogel to an amount of less than 0.3 wt %, more preferably less than 0.2 wt %, and most preferably less than 0.1 wt %, based on the total weight of the cogel.

If without an ion-exchange treatment the total of sodium and potassium of the cogel already amounts to less than 0.5 wt %, 0.3 wt %, 0.2 wt %, or 0.1 wt %, respectively, an ion-exchange treatment of course is not necessary. If, e.g., the cogel of the present invention is prepared using sodium- and potassium-free materials, a sodium- and potassium-free cogel results and an ion-exchange treatment is not necessary. However, if the counter-ions of the sodium- and potassium-free cogel are, e.g., metal ions with a low hydrolysability, it may be preferred to replace these metal ions partially or as a whole by hydrogen ions via, e.g., ion-exchange with ammonium ions or metal ions with a higher hydrolysability.

By ion-exchange treatment is meant any treatment by which the sodium and/or potassium ions, which act as counter-ions in the cogel, are replaced by ions which are the source of hydrogen ions. An ion-exchange treatment can be, e.g., an ion-exchange with ammonium ions or an ion-exchange with hydrolyzable metal ions.

It must be assured during the process of the present invention that the saponite content $C_A$ of the resulting final cogel is not equal to or higher than 60%. Preferably, the process of the present invention is carried out in such a way as to result in a cogel that has a saponite content $C_A$ of less than 55% and more preferably of less than 50% and preferably more than 10% and more preferably more than 20%. It is further preferred that the process of the present invention is carried out in such a way as to result in a final cogel with a saponite content $C_B$ of less than 30%, more preferably of less than 25%, still more: preferably of less than 20%. This can be done by selecting the ratio of the starting materials in such a way that the saponite content $C_A$ and optionally $C_B$ cannot become equal to or higher than the above-given values, independently from the time after which the precipitate is isolated. However, it is also possible to chose the time after which the precipitate containing the oxidic compounds of di-, tri-, and tetravalent metallic elements is isolated in such a way that -the above-given saponite contents are obtained, independently from the ratio of the starting materials. More specifically, if the ratio of the starting materials is such that the saponite content of the final cogel could, in principle, become higher than the above values, the time after which the precipitate is isolated must be chosen short enough in order to prevent this. Further, the time and/or the ratio of the starting materials is preferably chosen in such a way that the saponite content of the final cogel does not lie below the above given lower limits for the saponite content of the cogel. Generally, the time after which the precipitate is isolated is held short for economical reasons.

Hence, with the process of the present invention the time-consuming ageing step of prior art processes conventionally applied to obtain saponite minerals can be avoided. Reaction times can thus be shortened considerably, which of course is highly advantageous from an economical point of view.

The resulting precipitate is present as an aqueous suspension of the cogel. As in the preparation of clay minerals, the precipitate can be isolated via filtration. Surprisingly, it has now been found that with the process of the present invention cogels can be prepared which have a far better filterability than the materials obtained by the process described in WO 96/07613 where before filtration an ageing step is performed. Hence, it is possible to considerably shorten the time necessary for the separation of the mother liquid, the washing procedure of the cogel, and the subsequent ion-exchange, which of course is economically highly. favourable. With the process of the present invention cogels can be obtained with a filterability, expressed as normalized filtration time NFT, preferably of 1000 s or lower, more preferably of 500 s or lower, and most preferably of 200 s or lower.

Optionally, subsequent to the ion-exchange a calcination step is performed. This can suitably be done at a temperature of 350°–900° C., preferably of 400°–800° C. for a time period of generally 0.5–8 h.

The cogel of the present invention can be obtained by, for example, a) simultaneously mixing an aqueous solution of a source of oxidic compounds of one or more suitable trivalent metallic elements and an aqueous solution of a source of oxidic compounds of one or more suitable tetravalent metallic elements and an aqueous solution of a source of oxidic compounds of one or more suitable divalent metallic elements;

b) choosing the pH conditions in such a way as to cause the precipitation of the oxidic compounds of di-, tri-, and tetravalent metallic elements present in the mixture, and c) isolating the resulting precipitate containing the oxidic compounds of di-, tri-, and tetravalent metallic elements, if applicable before the saponite content $C_A$ of the precipitate has become equal to or higher than 60%, and, if necessary, d) carrying out an ion-exchange treatment to reduce the total of sodium and potassium present in the final cogel to an amount of less than 0.5 wt %, based on the total weight of the cogel.

Alternatively, the cogel of the present invention can be obtained by, e.g., a) simultaneously mixing an aqueous solution of a source of oxidic compounds of one or more suitable trivalent metallic elements and an aqueous solution of a source of oxidic compounds of one or more suitable tetravalent metallic elements, b) optionally choosing the pH conditions in such a way as to cause the precipitation of the oxidic compounds of tri- and tetravalent metallic elements present in the mixture;

c) optionally isolating and washing the resulting precipitate containing the oxidic compounds of tri- and tetravalent metallic elements;

d) subsequently adding an aqueous solution of a source of oxidic compounds of one or more suitable divalent metallic elements e) choosing the pH conditions in such a way as to cause the precipitation of the oxidic compounds of di-, tri-, and tetravalent metallic elements present in the mixture, f) isolating the resulting precipitate containing the oxidic compounds of di-, tri-, and tetravalent metallic elements if applicable before the saponite content $C_A$ of the precipitate has become equal to or higher than 60%, and, if necessary, g) carrying out an ion-exchange treatment to reduce the total of sodium and potassium present in the precipitate of step d) to less than 0.5 wt %, based on the total weight of the precipitate.

It must be noted that in the secondly specified preparation process, the ion-exchange treatment can also be carried out after step b) instead of after step f). However, in this case care must be taken in the further steps, e.g., during step e) that the amount of sodium and potassium of the resulting final cogel is not increased to above the desired value. If this should be the case, an additional ion-exchange treatment after step f) would become necessary to reduce the total of sodium and potassium present in the final cogel to the desired value.

Further, it must be noted that in principle the order of the process steps is not critical with respect to the addition of the sources of oxidic compounds of di-, tri- and tetravalent metallic elements. It must be noted again that independent of the order of the process steps, at least before the isolation step of the precipitate of the oxidic compounds of di-, tri-, and tetravalent metallic elements, the pH conditions must be chosen in such a way as to cause the precipitation of the oxidic compounds of di-, tri-, and tetravalent metallic elements present in the mixture.

The choice of the desired pH conditions can be effected by, e.g., adding the sources of oxidic compounds of di-, tri-, and tetravalent metallic elements to a water heel which has the desired pH. The skilled person can determine suitable pH values by simple routine experimentation.

For economic and environmental reasons, the precipitation conditions are preferably selected so that at least 80 wt %, more preferably at least 90 wt %, even more preferably at least 95 wt % and most preferably at least 98 wt % of the trivalent, tetravalent and divalent metallic elements contained in the starting materials are precipitated.

With increasing reaction temperatures, reaction times are shortened. It is considered preferable to carry out the reaction at temperatures above 60° C. and preferably above 7020 C. In principle, it is possible to carry out the reaction of the present invention under hydrothermal conditions.

The source of oxidic compounds of one or more trivalent metallic elements applied in the process of the present invention preferably comprises a source of oxidic compounds of aluminum, gallium, or borium, more preferably comprises, and most preferably consists essentially of a source of an oxidic compound of aluminum, preferably aluminum sulfate, or sodium aluminate or mixtures thereof.

The source of oxidic compounds of one or more tetravalent metallic elements applied in the process of the present invention preferably comprises a source of oxidic compounds of silicon or titanium, more preferably comprises and most preferably consists essentially of a source of oxidic compounds of silicon, preferably sodium silicate or potassium silicate or mixtures thereof. The source of oxidic compounds of one or more non-Group VIII divalent metallic elements applied in the process of the present invention preferably comprises and more preferably consists essentially of water-soluble salts of magnesium, zinc, manganese, copper, or beryllium, or mixtures thereof. Most preferably, the source of oxidic compounds of one or more non-Group VIII divalent metallic elements consists essentially of a water-soluble salt of magnesium, such as magnesium sulfate. These water soluble salts of non-Group VIII divalent metallic elements may optionally be combined with one or more water soluble salts of Group VIII non-noble metals.

The molar amount of the source of oxidic compounds of one or more trivalent metallic elements and the molar amount of the source of oxidic compounds of one or more tetravalent metallic elements generally is chosen such that the molar ratio between the resulting oxidic compounds of one or more tetravalent metallic elements and the resulting oxidic compounds of one or more trivalent metallic elements present in the product cogel is at least 2 and not more than 30 and preferably at least 4 and most preferably at least 6. It is further preferred that the molar amounts of the sources of oxidic compounds are chosen such that the molar ratio between the resulting oxidic compounds of one or more tetravalent metallic elements and the resulting oxidic compounds of one or more trivalent metallic elements present in the product cogel is not more than 20, more preferably not more than 12. Hence, in the case of the preferred aluminum and silicon, the molar amount of the source of alumina and the molar amount of the source of silica generally are chosen such that the molar ratio between the silica and the alumina present in the resulting cogel is at least 2 and not more than 30. Generally the sources of oxidic compounds are added such that the atomic ratio between the one or more divalent metallic elements and the total of tri- and tetravalent metallic elements contained in the product cogel lies between 0.03 and 1.00. It is preferred that the sources of oxidic compounds are added such that the atomic ratio between the one or more divalent metallic elements and the total of tri- and tetravalent metallic elements contained in the product cogel lies between 0.10 and 1.00 and more preferably between 0.20 and 0.50. If desired, the amount of oxidic compounds of one or more divalent metallic elements contained in the cogel can be reduced by an acid treatment. An acid treatment in the sense of the present invention is any contacting of the cogel with an acid in such a way that the amount of oxidic compounds of one or more divalent metallic elements is reduced.

Catalyst of the Present Invention

The catalyst according to the invention at least comprises the cogel of the present invention and a hydrogenation metal component. As will be evident to the skilled person, the word "component" in this context denotes the metallic form of the metal, its oxide form, or its sulfide form, or any intermediate, depending on the situation.

The hydrogenation metals are selected from the Periodic Table's Group VIB and Group VIII metals and mixtures thereof. The nature of the hydrogenation metal present in the catalyst is dependent on the catalyst's envisaged application. If, say, the catalyst is to be used for hydrogenating aromatics in hydrocarbon feeds, the hydrogenation metal used preferably will be one or more noble metals of Group VIII, preferably platinum, palladium, or a mixture thereof. In this case the Group VIII noble metal preferably is present in an amount of 0.05–5 wt %, more preferably in an amount of 0.1 to 2 wt %, calculated as metal. If the catalyst is to be used, e.g., for hydrodesulfurization and/or hydrodenitrogenation, it will generally contain a Group VIB metal component combined with a non-noble Group VIII metal component. In that case, preference can be given to the combination of, on the one hand, molybdenum, tungsten, or a mixture thereof with, on the other hand nickel, cobalt, or a mixture thereof. The Group VIB hydrogenation metal preferably is present in an amount of 2 to 40 wt %, more preferably in an amount of 5 to 30 wt %, most preferably in an amount of 5 to 25 wt %, calculated as trioxide. The Group VIII non-noble hydrogenation metal preferably is present in an amount of 1 to 10 wt %, more preferably in an amount of 2–8 wt %, calculated as oxide. If the catalyst is to be used in hydrocracking or mild hydrocracking, use will be made of either a Group VIII noble metal or a combination of a Group VIB metal and a Group VIII non-noble metal.

The cogels of the present invention possess a remarkable property as compared with well-known acidic components such as silica-alumina and zeolites in that they enable the hydrogenation metals as described above to be incorporated into the cogel itself. For instance, cobalt or nickel may be present as divalent metallic element in the cogel. In order to be active for hydrogenation, all or part of these metals can be converted into a catalytically active phase. This can be done, e.g., by means of reduction or sulfidation, for instance when the catalyst is sulfided under reducing conditions prior to use. Alternatively, the hydrogenation metals can be incorporated as counter-ions through ion-exchange.

In addition to the cogel of the present invention, the catalyst may comprise support materials, e.g., alumina, silica, silica-alumina, silica-magnesia, zirconia, titania, silica-zirconia, silica-titania, clays, molecular sieves, aluminophosphates, and mixtures of these materials. These support materials can consist of matrix materials which function as binder for the cogel, thus improving the attrition resistance of the catalyst particles, or as filler material, acting as diluent of the cracking activity of the cogel, thus making it possible to regulate the cracking activity of the catalyst. On the other hand, these support materials can also add a catalytic activity of their own to the catalyst according to the invention. For example, the incorporation of silica-alumina or a molecular sieve component into the catalyst composition will add a specific cracking activity to the catalyst composition. The amount of support material which is present in the catalyst composition according to the invention will depend on its function. Support materials are generally present in the catalyst of the present invention in an amount of 5–90 wt %, calculated on the weight of the catalyst composition. For example, catalysts are envisaged containing 10–60 wt % of the cogel, 1–45 wt % of hydrogenation metal component, and the balance a support material acting as binder/filler. Suitable support materials acting as binder/filler matrix materials are, for example, alumina, silica, titania, and zirconia, with alumina generally being especially suitable. The amount of support materials with catalytic cracking activity will depend upon the activity desired. If these types of catalytically active support materials are present, they preferably are present in an amount of 10–80 wt %, calculated on the weight of the catalyst composition, more preferably in an amount of 20–50 wt %. Of course, catalysts comprising two types of support materials are also envisaged in the present invention.

Optionally, the catalyst can further contain other components such as phosphorus. It will be obvious to the skilled person that phosphorus can be incorporated into the catalyst in a suitable manner by contacting the catalyst during any one of its formative stages with an appropriate quantity of a phosphorus-containing compound, e.g., phosphoric acid. For instance, the catalyst can be impregnated with an impregnating solution comprising phosphorus in addition to any other components. If the catalyst according to the invention contains phosphorus, this compound preferably is present in an amount of 0.5–1.0 wt %, calculated as $P_2O_5$, based on the weight of the catalyst composition.

The catalyst according to the invention generally has a specific surface area in the range of 50 to 600 m/g, preferably in the range of 100 to 400 $m^2/g$ (after calcination).

Preparation of the Catalyst According to the Invention

The catalyst according to the invention can be prepared in several ways. For instance, it is possible to extrude the cogel into particles, calcine the extrudates, and impregnate the calcined extrudates with an impregnating solution containing salts of the hydrogenation metals to be introduced, optionally in combination with other components such as phosphoric acid and/or complexing agents known in the art. Alternatively, the cogel can be mixed with other support materials which, as explained above, may have their own catalytic activity, whereupon this mixture can be extruded and the resulting extrudates calcined. The calcined extrudates can then be impregnated as described above. It is also possible to add certain hydrogenation metal components to the catalyst composition prior to extrusion, more particularly, it is proposed to mix the cogel and any other support materials with molybdenum oxide, after which the resulting mixture is extruded and calcined.

As was stated earlier, cogels containing hydrogenation metals of their own can also be used in the catalyst according to the invention. The hydrogenation metals can be added, e.g., during the preparation of the cogel, resulting in their incorporation into the cogel. While it may be that the catalyst contains only those hydrogenation metals introduced via the cogel, it is also possible to incorporate other, additional hydrogenation metals into the catalyst composition. Furthermore, part or all of the hydrogenation metals can be incorporated as counter-ions of the cogel, to counterbalance the cogel's negative charge. It will be evident to the skilled person that it is also possible to combine the different aspects of the processes described above. Thus, a portion of the hydrogenation metals can be introduced via impregnation, while another portion is mixed with the cogel before it is formed into a support, or a portion of the hydrogenation metals is incorporated into the catalyst composition by way of the cogel, while another portion is added to the catalyst composition by impregnation of the shaped support.

The catalyst particles may have many different shapes. The suitable shapes include spheres, cylinders, rings, and symmetric or asymmetric polylobes, for instance tri- and quadrulobes. The particles usually have a diameter in the range of 0.5 to 10 mm, and their length likewise is in the range of 0.5 to 10 mm.

If the catalyst contains non-noble Group VIII metals and/or Group VIB metals as hydrogenation metals, it is preferably sulfided prior to use. This involves converting the metal components in the catalyst to their sulfided form. The sulfiding can be done by means of processes known to the skilled person, e.g., by contacting the catalyst in the reactor at rising temperature with hydrogen and a sulfurous feed, or with a mixture of hydrogen and hydrogen sulfide. If the catalyst contains a Group VIII noble metal, there is no need for sulfiding as a rule, and a reducing step, e.g., with hydrogen, will suffice. As stated before, if the cogel contains hydrogenation metals such as cobalt or nickel, these will be freed from the cogel by sulfidation. Because the hydrogenation metals are distributed homogeneously through the cogel, the hydrogenation metals will be distributed homogeneously over the catalyst composition after sulfidation.

Use of the Catalyst According to the Invention

Depending on their composition, the catalysts according to the invention can be used in virtually all hydroprocessing processes to treat a plurality of feeds under wide-ranging reaction conditions, e.g., at temperatures in the range of 200° to 440° C., hydrogen pressures in the range of 5 to 300 bar, and space velocities (LHSV) in the range of 0.05 to 10 h$^{-1}$. The term "hydroprocessing" in this context encompasses all processes in which a hydrocarbon feed is reacted with hydrogen at elevated temperature and elevated pressure. These processes include hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. In particular, certain catalysts according to the invention are suitable for use in the hydrocracking of heavy feedstocks to form middle distillates. For these hydrocracking processes; the following values for the relevant process parameters apply:

temperature: in the range of 230° to 450° C.;
hydrogen pressure: in the range of 100 to 250 bar;
space velocity: in the range of 0.2 to 3 hours$^{-1}$;
H$_2$/oil ratio: in the range of 300 to 2000 Nl/l.

Generally, the conditions selected are such as will give a conversion of at least 70 wt %. The term conversion in this context refers to the weight, in per cent, of obtained product with a boiling point below 391° C. (where applicable, this weight is corrected by taking into account the weight of the portion of the feedstock which already boils below 391° C.) vis-a-vis the weight of the feedstock employed. An example of a catalyst according to the invention which is suitable for use in hydrocracking to produce middle distillates is a catalyst comprising 3–40 wt % of hydrogenation metals, preferably comprised of a combination of Ni and Mo or W, 1–60 wt % of cogel, preferably 10–50 wt %, 3–55 wt % of zeolite, preferably 10–50 wt %, and the balance alumina.

An example of a catalyst according to the invention which is suitable for the production of diesel by way of hydrocracking comprises a Group VIB hydrogenation metal component, a non-noble Group VIII hydrogenation metal component, the cogel of the present invention in combination with a Y-zeolite with a unit cell size in the range of 2.400–2.480 nm and preferably in the range of 2.415–2.455 nm.

The use of the catalysts according to the invention in mild hydrocracking processes is also envisaged. For mild hydrocracking processes, the following values hold for the relevant process parameters:

temperature: in the range of 350° to 450° C.;
hydrogen pressure: in the range of 25 to 100 bar, preferably in the range of 40 to 80 bar;
space velocity: in the range of 0,2 to 3 hours$^{-1}$;
H$_2$/oil ratio: in the range of 200 to 1000 Nl/l.
Generally, the conditions selected are such as will give a conversion of at least 20 wt %. The definition of conversion is the same as that given above.

An example of a catalyst according to the invention which is suitable for use in mild hydrocracking to produce middle distillates is a catalyst comprising 3–40 wt %, preferably 10–40 wt %, of hydrogenation metal components, which preferably are a combination of Ni and Mo or W, 5–75 wt % of a cogel of the present invention, preferably 15–50 wt %, and 0–95 wt %, preferably 5–50 wt %, of alumina binder.

The catalysts according to the present invention are also very suitable for use in hydroisomerization, more particularly for the difunctional hydroisomerization of long chain paraffins. These long chain paraffins, also known as waxes, are molecules that have a negative effect on the quality of diesel fuels and lube oils. In diesel fuels, the wax molecules tend to crystallize at unacceptably high temperatures, so rendering the diesel unsuitable for fuel applications during wintertime. In lube oils, waxes will mainly affect the viscosity. Hence, these molecules must be removed. Two ways to achieve this are known in the literature, namely cracking the molecules to lower boiling molecules and isomerization of the molecules to isoparaffins. A (hydro)cracking dewaxing catalyst will by nature convert some of the feedstock, namely the n-paraffins, to products outside the desired boiling range, thus limiting the attainable yields of middle distillate. A hydroisomerization process, on the other hand, will convert the n-paraffins to isoparaffins, which have boiling points in the desired range but melting/crystallization points (i.e., cloud points) much lower than those of the n-paraffins.

It has been found that the catalyst according to the invention is also suitable for use in the hydroisomerization of wax-containing feedstocks. Such a catalyst contains a hydrogenation component consisting of one or more of Group VIB metal components and Group VIII metal components, more particularly, the Group VIII noble metals. Most preferably, the hydrogenation component is platinum, palladium, or a combination of the two.

The presence of the cogel in the catalyst according to the invention is advantageous for the hydroisomerization of wax-containing feedstocks, because it has a combination of desirable properties. The low acidity of the cogel precludes hydrocracking of the product isoparaffins. The properties of the cogel are such that a good dispersion of the hydrogenation component is ensured. The effects of mass diffusion limitation are eliminated by controlling the properties of the support. It is preferred in this specific application to prevent hydrocracking through binder-support interactions by using a binder material which does not give rise to such interactions, e.g., silica or titania. Alternatively, it may be preferable to shape the cogel support without any binder whatsoever. A particularly preferred catalyst for use in hydroisomerisation is a catalyst comprising 0.1–2.0 wt % of platinum, palladium, or a mixture thereof, 1–99.9 wt %, preferably 10–50 wt %, of the cogel of the present invention, and 0–98.9 wt %, preferably 50–90 wt %, of silica, titania, or a mixture thereof.

It must be noted that the cogels of the present invention can also be used for catalytic applications different from hydroprocessing such as fluid catalytic cracking (FCC).

The present invention is illustrated by the following Examples.

EXAMPLE 1

Preparation of a Catalyst According to the Invention a) Preparation of the Cogel An amount of 0.44 kg of a sodium aluminate solution (26% $Al_2O_3$, 20% $Na_2O$), 3.80 kg of a magnesium sulfate solution (6.34%.MgO) and 4.85 kg diluted water glass (4.2% $Na_2O$, 13.8% $SiO_2$), were simultaneously added within 30 min at 80° C. to a 30 l stainless steel reactor, containing about 10 kg of water at the start. Caustic soda (15%) was used to control the pH at 8.5. Subsequently, the resulting slurry was filtered and the obtained filter cake washed three times with 10 kg water (60° C.). The filterability of the washed filter cake was much better than that obtained with a conventional saponite material. The normalized filtration time NFT (prior to ammonium exchange) was only 57 s.

7.5 kg of the washed filter cake (14.7% solids) were reslurried in 3 kg water containing 170 g of ammonium chloride to effect ammonium exchange. The mixture was stirred for 1 h at 60° C. and a pH maintained at 5.5. The mixture was then dewatered and the whole procedure was repeated once again. The filter cake was then washed thoroughly with water until no chloride could be detected anymore using a silver-nitrate solution. The NFT of this exchanged filter cake was determined. Finally, the filter cake was dried overnight at 120° C. The resulting ammonium-exchanged cogel had the following characteristics:

| | |
|---|---|
| total of sodium and potassium | 0.07 wt % |
| saponite content $C_A$ | 47% |
| saponite content $C_B$ | 12% |
| surface area (BET) | 621 m$^2$/g |
| surface area (BET) | 531 m$^2$/g (calcined) |
| surface area ratio | 0.86 |
| CEC | 3.3 wt % |
| CEC | 3.0 wt % (calcined) |
| CEC ratio | 0.91 |
| NFT | 483 s |
| amount of tetrahedrally coordinated aluminum | 84% |
| silica/alumina molar ratio | 9.9 |
| magnesium/(aluminum + silicon) atomic ratio | 0.28 | b) Preparation of the Catalyst

Alumina was peptized by mixing it with some $HNO_3$ and water. Then such an amount of the cogel prepared under a) was added as to obtain a mixture containing 65 wt % of the cogel and 35 wt % alumina. After kneading until an extrudable dough was formed, the mixture was extruded to cylindrical extrudates with a diameter of 1.5 mm. The extrudates were dried overnight at 120° C. and subsequently calcined for one hour at 525° C.

The extrudates were impregnated with an aqueous solution of ammonium heptamolybdate, subsequently dried at 120° C., and calcined at 525° C. for one hour. The molybdenum-containing extrudates were then loaded with CoO by impregnation with a cobalt nitrate solution. After impregnation the extrudates were again dried at 120° C. and calcined for one hour at 525° C. The resulting catalyst contained 14.0 wt % $MoO_3$ and 4 wt % CoO, based on the total weight of the catalyst.

EXAMPLE 2

Preparation of a Catalyst According to the Invention a) Preparation of the Cogel The procedure of Example 1, step a) was repeated using 3.26 kg of an aluminum sulfate solution (4.9% $Al_2O_3$), 4.18 kg of a magnesium sulfate solution (6.34% MgO), and 6.47 kg diluted water glass (4.2% $Na_2O$, 13.9% $SiO_2$), and caustic soda (14%) for pH control at 8.5. Subsequently, the resulting slurry was filtered and the obtained cake washed twice with 15 kg water (60° C.). The normalized filtration time NFT of this cake was 101 s.

Subsequently, after reslurrying 7.5 kg of the washed filter cake (16.4% solids) in 4 kg water an ammonium-exchange was carried out following the procedure of Example 1. The resulting ammonium-exchanged cogel had the following characteristics:

| | |
|---|---|
| total of sodium and potassium | 0.04 wt % |
| saponite content $C_A$ | 45% |
| saponite content $C_B$ | 10% |
| surface area | 512 m$^2$/g |
| surface area | 397 m$^2$/g (calcined) |
| surface area ratio | 0.78 |
| CEC | 3.5 wt % |
| CEC | 2.4 wt % (calcined) |
| CEC ratio | 0.69 |
| NFT | 149 s |
| amount of tetra coordinated aluminum | 90% |
| silica/alumina molar ratio | 9.22 |
| magnesium/(aluminum + silicon) atomic ratio | 0.22 | b) Preparation of the Catalyst

The catalyst was prepared according to the procedure of Example 1, step b).

EXAMPLE 3

Preparation of a Cogel According to the Invention

An amount of 1.96 kg of an aluminum sulfate solution (8.11% $Al_2O_3$), 7.03 kg of a magnesium sulfate solution (4.71% MgO):and 4.12 kg water glass (8.5% $Na_2O$, 27.5% $SiO_2$), were simultaneously added within 1 hour at 80° C. to a 30 l stainless steel reactor, containing 8.9 kg of water at the start. Caustic soda (50%) was used to control the pH at 8.5. The resulting slurry was stirred for an additional hour. To determine the NFT of the precipitate, part of the slurry was filtered and the obtained filter cake was washed three times with 7 kg water (60° C.). The normalized filtration time NFT (prior to ammonium exchange) was only 13 s. 0.56 kg of the remaining part of the slurry was filtered and subsequently exchanged on filter with 2 times 100 ml of an aqueous solution containing 4.9 g ammonium sulfate (60° C.). After reslurrying and filtration, the NFT of this exchanged filter cake was determined. Finally, the filter cake was dried overnight at 120° C. The resulting ammonium exchanged cogel had the following characteristics:

| | |
|---|---|
| total of sodium and potassium | 0.05 wt % |
| saponite content $C_A$ | 55% |
| saponite content $C_B$ | 16% |
| surface area (BET) | 514 m$^2$/g |
| surface area (BET) | 418 m$^2$/g (calcined) |
| surface area ratio | 0.81 |
| CEC | 2.7 wt % |
| CEC | 2.3 wt % (calcined) |
| CEC ratio | 0.85 |
| NFT | 21 s |
| amount of tetrahedrally coordinated aluminum | 92% |
| silica/alumina molar ratio | 11.9 |
| magnesium/(aluminum + silicon) atomic ratio | 0.39 |

EXAMPLE 4

Preparation of a Cogel According to the Invention

An amount of 0.73 kg of a sodium aluminate solution (26.2% $A_2O_3$, 19.4% $Na_2O$) and 3.26 kg water glass (8.4% $Na_2O$, 27.8% $SiO_2$), were simultaneously added within 30 minutes at 339° C. to a 30 l stainless steel reactor, containing 13.9 kg of water at the start. Sulfuric acid (30%) was used to control the pH at 9.5. The resulting slurry was stirred for an additional 5 minutes and subsequently 1.50 kg of a magnesium sulfate solution (6.34% MgO) was added in 5 minutes. The pH was maintained at 9.5 with caustic soda (15%). The resulting slurry was stirred for 5 minutes. An amount of 245 g of the freshly prepared slurry was filtered, and the NFT was determined (198 s).

Subsequently, the filter cake was exchanged on filter with 3 times 1 displacement of ammonium chloride solution (pH 5.5) containing 2 equivalent of $NH_4$ per Al. The exchanged filter cake was reslurried, filtered and subsequently the NFT was determined. Finally, the filter cake was dried overnight at 120° C. The resulting ammonium exchanged cogel had the following characteristics:

| | |
|---|---|
| total of sodium and potassium | 0.04 wt % |
| saponite content $C_A$ | <5% |
| saponite content $C_B$ | <5% |
| surface area (BET) | 436 m$^2$/g |
| surface area (BET) | 378 m$^2$/g (calcined) |
| surface area ratio | 0.87 |
| CEC | 5.1 wt % |
| CEC | 3.1 wt % (calcined) |
| CEC ratio | 0.61 |
| NFT | 168 s |
| amount of tetrahedrally coordinated aluminum | 94% |
| silica/alumina molar ratio | 7.70 |
| magnesium/(aluminum + silicon) atomic ratio | 0.10 |

EXAMPLE 5

Preparation of a Cogel According to the Invention

An amount of 0.73 kg of a sodium aluminate solution (26.2% $A_2O_3$, 19.4% $Na_2O$), 1.50 kg of a magnesium sulfate solution. (6.34%.MgO) and 3.25 kg water glass (8.4% $Na_2O$, 27.8% $SiO_2$), were simultaneously added within 30 minutes at 30° C. to a 30 l stainless steel reactor, containing 13.9 kg of water at the start. Sulfuric acid (30%) was used to control the pH at 9.5. The resulting slurry was stirred for another 5 minutes. An amount of 240 g of the freshly prepared slurry was filtered, and NFT was determined (136 s).

Subsequently, the filter cake was exchanged on filter with 3 times 1 displacement of ammonium chloride solution (pH 5.5) containing 2 equivalents of $NH_4$ per Al. The exchanged filter cake was reslurried, filtered and subsequently the NFT was determined. Finally, the filter cake was dried overnight at 120° C. The resulting ammonium exchanged cogel had the following characteristics:

| | |
|---|---|
| total of sodium and potassium | 0.04 wt % |
| saponite content $C_A$ | <5% |
| saponite content $C_B$ | <5% |
| surface area (BET) | 439 m$^2$/g |
| surface area (BET) | 352 m$^2$/g (calcined) |
| surface area ratio | 0.80 |
| CEC | 4.8 wt % |
| CEC | 3.2 wt % (calcined) |
| CEC ratio | 0.67 |
| NFT | 236 s |
| silica/alumina molar ratio | 7.9 |
| magnesium/(aluminum + silicon) atomic ratio | 0.11 |

For good order's sake, it is noted that when in the above Examples a surface area or CEC value is indexed by the term "calcined", this means that this value has been obtained from a sample previously calcined in air for one hour at 550° C.

What is claimed is:

1. A cogel comprising oxidic compounds of one or more trivalent metallic elements selected from the group of aluminum, borium, gallium, chromium, iron, cobalt, manganese, vanadium, molybdenum, tungsten, indium, rhodium, scandium, or mixtures thereof, oxidic compounds of one or more tetravalent metallic elements selected from the group of silicon, titanium, germanium, or mixtures thereof, and oxidic compounds of one or more divalent metallic elements with at least one divalent metallic element not selected from Group VIII non-noble metallic elements, wherein a) the cogel is essentially X-ray amorphous apart from saponite, if present;
   b) the saponite content $C_A$ of the cogel is less than 60 wt. %;
   c) the cogel has a surface area of at least 400 m$^2$/g;
   d) the cogel has a cation-exchange capacity of at least 0.5 wt %; and
   e) the total of sodium and potassium contained in the cogel amounts to less than 0.5 wt %, based on the total weight of the cogel.

2. The cogel of claim 1 wherein the trivalent metallic element comprises aluminum.

3. The cogel of claim 1 wherein the tetravalent metallic element comprises silicon.

4. The cogel of claim 1 wherein the divalent metallic element comprises a non-Group VIII metallic element and a Group VIII non-noble metallic element.

5. The cogel of claim 4 wherein the Group VIII non-noble metallic element is selected from nickel, cobalt, or mixtures thereof.

6. The cogel of claim 4 wherein the non-Group VIII metallic element comprises magnesium.

7. The cogel of claim 1 wherein the molar ratio between the oxidic compounds of the one or more tetravalent metallic elements and the oxidic compounds of the one or more trivalent metallic elements contained in the cogel is at least 2 and not more than 30.

8. The process for preparing the cogel of claim 1 comprising the steps of mixing an aqueous solution of a source of oxidic compounds of one or more suitable trivalent metallic elements and an aqueous solution of a source of oxidic compounds of one or more suitable tetravalent metallic elements and an aqueous solution of a source of oxidic compounds of one or more suitable divalent metallic elements; choosing the pH conditions in such a way as to cause the precipitation of the oxidic compounds of di-, tri-, and tetravalent metallic elements present in the mixture; isolating the precipitate containing the oxidic compounds of di-, tri-, and tetravalent metallic elements, if applicable before the saponite content $C_A$ of the precipitate has become equal to or higher than 60%.

9. The process of claim 8 wherein an ion-exchange treatment is carried out to reduce the total of sodium and potassium present in the final cogel to an amount of less than 0.5 wt %, based on the total weight of the cogel.

10. The process of claim 8 wherein the source of oxidic compounds of one or more trivalent metallic elements and the source of oxidic compounds of one or more tetravalent metallic elements and the source of oxidic compounds of one or more divalent metallic elements are mixed together simultaneously.

11. The process of claim 8 wherein the source of oxidic compounds of one or more trivalent metallic elements and the source of oxidic compounds of one or more tetravalent metallic elements are mixed together prior to the addition of the source of oxidic compounds of one or more divalent metallic elements.

12. A catalyst comprising the cogel of claim 1 and a hydrogenation metal component.

13. The catalyst of claim 12 wherein the hydrogenation metal component is selected from a component of a Group VIB metal, a component of a Group VIII metal, or mixtures thereof.

14. The catalyst of claim 12 wherein the catalyst comprises at least 5 wt % of a support material.

15. The catalyst of claim 14 wherein the support material is selected from alumina, silica, titania, zirconia, or mixtures thereof.

16. The catalyst of claim 14 wherein the catalyst additionally comprises a support material with catalytic activity which is selected from silica-alumina, a molecular sieve component, or mixtures thereof.

17. A process for preparing the catalyst of claim 12 wherein at least a hydrogenation metal component is incorporated into the cogel.

18. The process of claim 17 wherein the cogel is mixed with a support material prior to, during or subsequent to the incorporation of the hydrogenation metal component.

19. The process of claim 17 wherein the cogel together with any support material present is extruded into particles and subsequently calcined either before or after the incorporation of the hydrogenation metal component.

20. A process selected from the group consisting of hydrodesulfurization, hydrodenitrogenation, hydrodemetallization, hydrodearomatization, hydroisomerization, hydrodewaxing, and hydrocracking in which a hydrocarbon feedstock is reacted with hydrogen under mild pressure conditions in the presence of the catalyst of claim 12.

21. A process of claim 20 wherein heavy hydrocarbon feedstocks are hydrocracked to produce diesel.

* * * * *